M. BRAND.
PROCESS OF SMOKING AND CURING MEAT PRODUCTS.
APPLICATION FILED DEC. 5, 1908.
928,900.
Patented July 20, 1909.
2 SHEETS—SHEET 2.
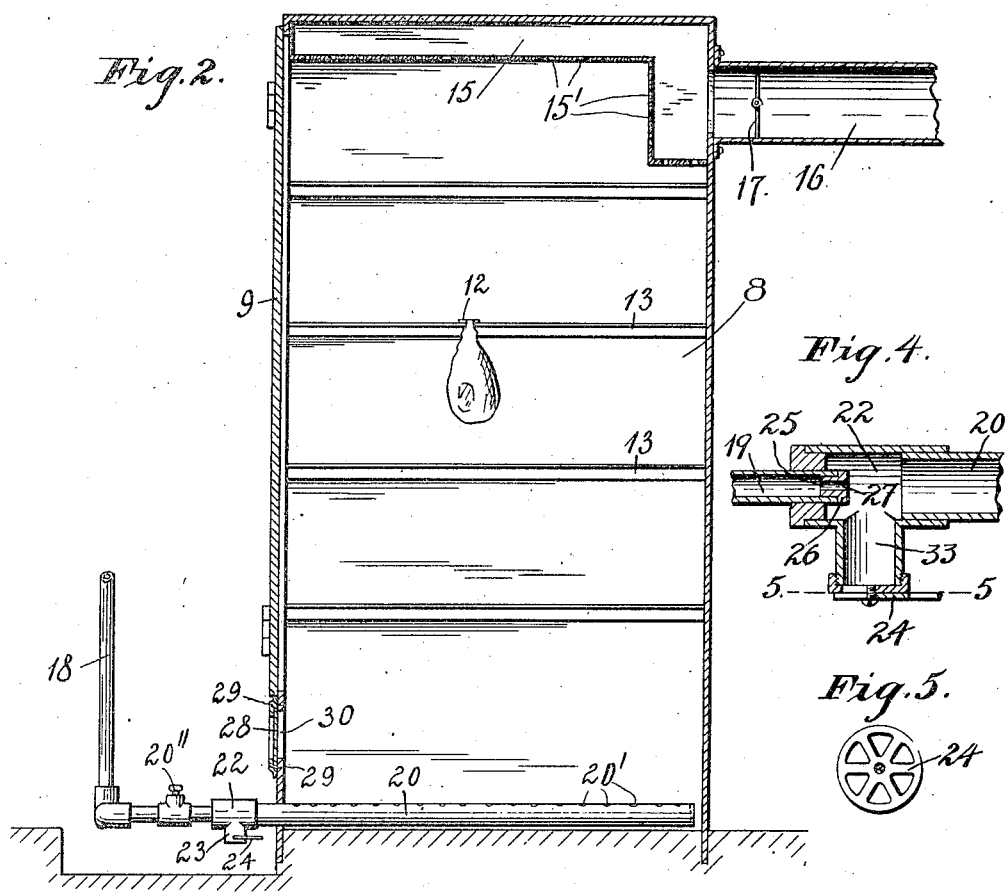

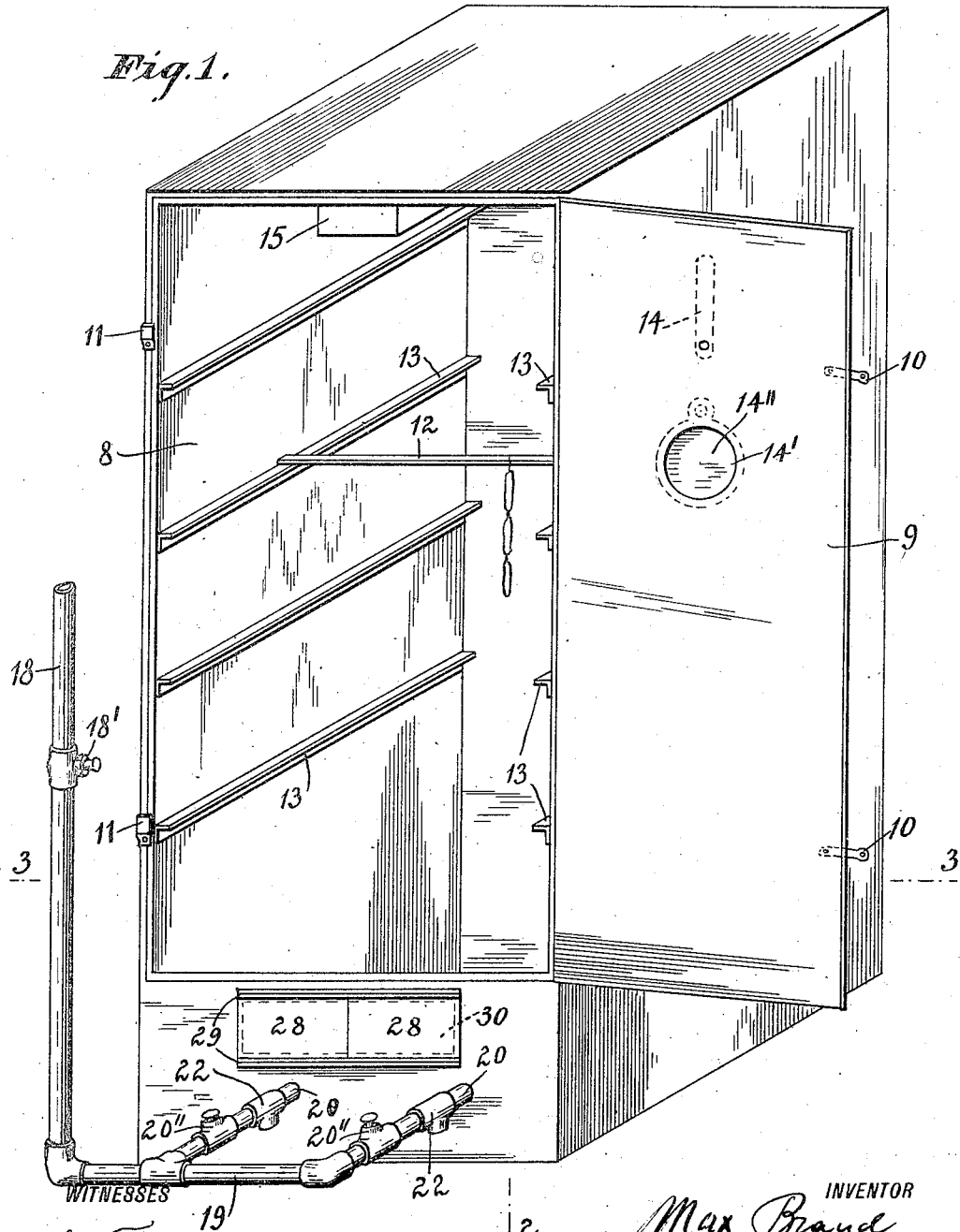

UNITED STATES PATENT OFFICE.

MAX BRAND, OF NEW YORK, N. Y., ASSIGNOR TO IMPROVED SMOKING PROCESS CO., OF NEW YORK, N. Y., A CORPORATION OF NEW YORK.

PROCESS OF SMOKING AND CURING MEAT PRODUCTS.

No. 928,900.      Specification of Letters Patent.      Patented July 20, 1909.

Application filed December 5, 1908. Serial No. 466,174.

*To all whom it may concern:*

Be it known that I, MAX BRAND, a citizen of the United States, and resident of the city of New York, in the county of New York and State of New York, have invented certain new and useful Improvements in Processes of Smoking and Curing Meat Products, of which the following is a specification.

The ordinary process of smoking or curing meat products, such as sausages, hams, fish, etc., consists in building a wood fire, usually out of hickory-, oak-chips or shavings, or saw dust, in a closed fire-proof chamber or smoke house, and after such a fire has reached a smoldering condition, in placing the meat products in such compartment for a sufficient time to allow them to be slightly cooked, and smoked to acquire the flavor of the smoldering wood-fire and to be preserved from putrefaction. Obviously such a process is very slow, expensive and irregular, for the reason that it takes considerable time to bring the fire to the right condition and the different fires will necessarily be different in cooking, and smoking properties, since the temperature in the compartment cannot be maintained at a predetermined degree, and since, on the other hand, the smoldering condition of the fire is not under the control of the operator. Another serious defect of this process consists in the fact, that an unsatisfied combustion takes place in the smoke-house, whereby the loose carbon particles cover the usually wet meat products, producing thus an inferior and often not marketable product.

The object of the present invention is to provide a new process, whereby the meat products are dried, slightly cooked and smoked in a more satisfactory and expeditious way by subjecting the same in a compartment, first, to the heat of ordinary illuminating gas, mixed with air enough to burn the same completely, and, second, to the action of hot air mixed with the fumes and smoke of wood chips. By treating the products in this way, the same are cooked to some extent and an appetizing smoky flavor is imparted to the same. Both the degree of cooking and smoking depends on a number of conditions, as will be hereinafter readily seen. When a dark product is desired, the products may be smoked without having them previously dried, that is without having the surface moisture evaporated therefrom. Obviously the gas burners and wood chips may be placed in the compartment, holding the meat products, or be arranged and placed in a compartment, independent of the smoke-house in which the articles are placed for cooking and smoking.

Other objects and advantages of the invention will be apparent from reading the specification and examining the drawings, forming part of the present application for Letters Patent.

The drawings illustrate apparatus for carrying out the objects of the present invention, and more particularly Figure 1 is a perspective view of an apparatus, Fig. 2 a section taken on line 2, 2 of Fig. 1, and Fig. 3 a section taken on line 3, 3 of Fig. 1. Fig. 4 is a detail of construction of the gas-, and the combined gas- and air-supply pipe, and Fig. 5 is a section taken on line 5, 5 of Fig. 4.

Referring more particularly to the device illustrated in Figs. 1 to 3, inclusive, the numeral 8 designates a compartment, that is the smoke compartment, preferably, made of suitable metal which may be lined or coated with a suitable refractory material, if desired, which lining is, however, not shown in the drawings. The smoke-house is provided with a door 9, hinged to or arranged slidably on said smoke-house, whereby the latter may be closed air-tight by means of the coöperating locking devices 10 and 11, carried by said door and smoke-house, respectively. The meat product supporters or bars 12, 12 are placed upon brackets 13, 13; preferably, angle irons, riveted or otherwise secured to the inner walls of the compartment, whereby the meat product supporters extend from side to side. The compartment carries outside a thermometer 14, which is in contact with the air of the interior of the compartment, whereby the temperature inside of said compartment may be watched. An opening 14' in the door 9 is normally closed by a pivoted cover 14''. The attendant may ascertain through this opening the stages, etc., of the process. Inside of and near to the top of the compartment or smoke-house is arranged a draft-tube 15, connected with the smoke-offtake pipe 16, having provided therein a damper 17, for a purpose hereinafter to be described. The draft-tube 15 is provided with small perforations 15', 15', throughout its length so that the products of combustion, after having passed the meat products, may pass to the smoke-offtake 16 without being drawn immediately from the bottom of the smoke-house to one side of the same, allowing thus all of the meat products to be treated with the same degree of heat and causing the smoke to come in close contact with all of the said products. The damper 17, arranged in the smoke-offtake 16, is, preferably, perforated and may act automatically, that is open when the pressure or draft becomes too great in the smoke-house 8.

The numeral 18 designates the gas supply pipe, conveying common illuminating gas from the main to the apparatus. A stopcock 18' is provided for a well known purpose. The gas pipe is connected with a substantially horizontal pipe 19, from which extend a plurality of pipes 20, provided with a plurality of perforations 20', conducting the gas and air into the compartment 8, and being arranged near to or resting upon the ground, so that the wood chips or saw dust cover to some extent said pipes, whereby the former may be easily ignited. The gas pipe 19 and the combined gas and air pipes 20 are united by T-pipes 22, 22, the end 23 of which is open to the external atmosphere. Obviously regulating valves 24, 24 may be arranged in the ends 23 of the T-pipes, for a well known purpose. It will be observed from Fig. 4 that the outlets 25, 25 of the gas supply pipes are obstructed by plugs 26, 26, having holes 27, 27, as usual with the devices of this character. Each of the combined gas- and air-suply pipes may be controlled by independent cocks 20''.

Sliding doors 28, 28 are mounted in guides 29, 29, as shown in Fig. 1 of the drawings, which doors, when closed, cover an opening 30 of the smoke-house. By means of this arrangement access may be gained to the pipes 20, 20, and a supply of wood chips may be placed into the compartment during the process. Furthermore air may be admitted to the smoke-house and this supply of air regulated according to the requirements.

The process is carried out as follows: The smoke-house having been charged with the material to be treated, the door of the smoke-house is closed. The gas and air issuing out of the perforations of the burner pipes 20, 20 is then ignited, the adjustment valves 24, 24 having been set so that the gas becomes mixed with air to burn at once and completely, producing thus an intense heat which rapidly carries up the temperature within the compartment to the desired degree, that is to a degree at which the surface moisture be evaporated from the meat products, and the same will be slightly cooked. Obviously the temperature within the compartment can be varied in several ways, that is by regulating the gas supply or by varying, by means of the sliding doors 28, 28, the size of the opening 30, or finally by the damper 17 in the smoke-offtake 16. After this step of the process wood chips are placed in the compartment, which are, of course, ignited by the burner pipes 20, 20. The smoke mixed with the hot air will thus cook and smoke the meat to any desired degree. At the completion of the process the gas is turned off, the damper 17 in the smoke-offtake 16 is opened, and cold air is admitted through the opening 30, which air forces the smoke into the offtake pipe 16. In this manner the smoke-house is within a short time and easily freed from smoke so that, when the door is opened, the cured meat products may be removed. The wood chips may be placed in the compartment either by opening the door 9, or the sliding doors 28, and placing the wood chips above the pipes 20, 20, by a suitable implement.

The advantages of the process described are obvious. In using illuminating gas, the process may be effected in a less expensive more expeditious and regular way than when using wood for heating the smoke-house and smoking the meat products. Moreover, in mixing the gas with sufficient air before burning, an intense heat may be produced which rapidly raises the temperature of the smoke-house to the desired degree and cooks the meat products to any desired extent. Furthermore in causing the heat to be equally divided over the compartment, the cresote obtained by burning the wood chips is evenly divided and comes, therefore, in contact with the meat products in a more satisfactory way than when using a smoke-house with a draft-tube, as heretofore in use. By supplying enough air to produce a complete combustion of gas, the gas is burned at once and completely, whereby the carbon and hydrogen is converted to carbonic gas and water and no particles of carbon escape unconsumed to cause the flame to be smoky. Obviously a not smoky flame is very desirable, since otherwise the meat products would be covered with the carbon particles so escaping, whereby a much inferior product would be obtained.

What I claim is:

1. The process of curing and smoking green and moist meat products, which consists in subjecting the same in a compartment, first, to the action of heat, generated by burning a supply of illuminating gas mixed with air enough to produce a complete combustion of the same, and, second, subjecting the meat products, while in said chamber, to the action of the products of combustion of wood to preserve the same from putrefaction and to impart to the same a wood-smoke flavor.

2. The process of curing and smoking green and moist meat products, which consists in subjecting the same in a compartment, first, to the action of heat, generated by burning a supply of carbureted gas mixed with air sufficient to produce a complete combustion of the same, whereby the surface moisture of the meat products is evaporated and the same are slightly cooked, and, second, in subjecting the products, while in said chamber, to the action of the products of combustion of wood to preserve the same from putrefaction and to impart to the same a wood-smoke flavor.

Signed at New York, in the county of New York and State of New York, this 21st day of November, A. D. 1908.

MAX BRAND.

Witnesses:
SIGMUND HERZOG,
LEO BRAND.